Dec. 17, 1940.    G. W. ENGSTROM    2,224,955
TRACTOR
Filed March 6, 1939    3 Sheets-Sheet 1

Inventor
Gustaf W. Engstrom
By Paul O. Pippel
Atty.

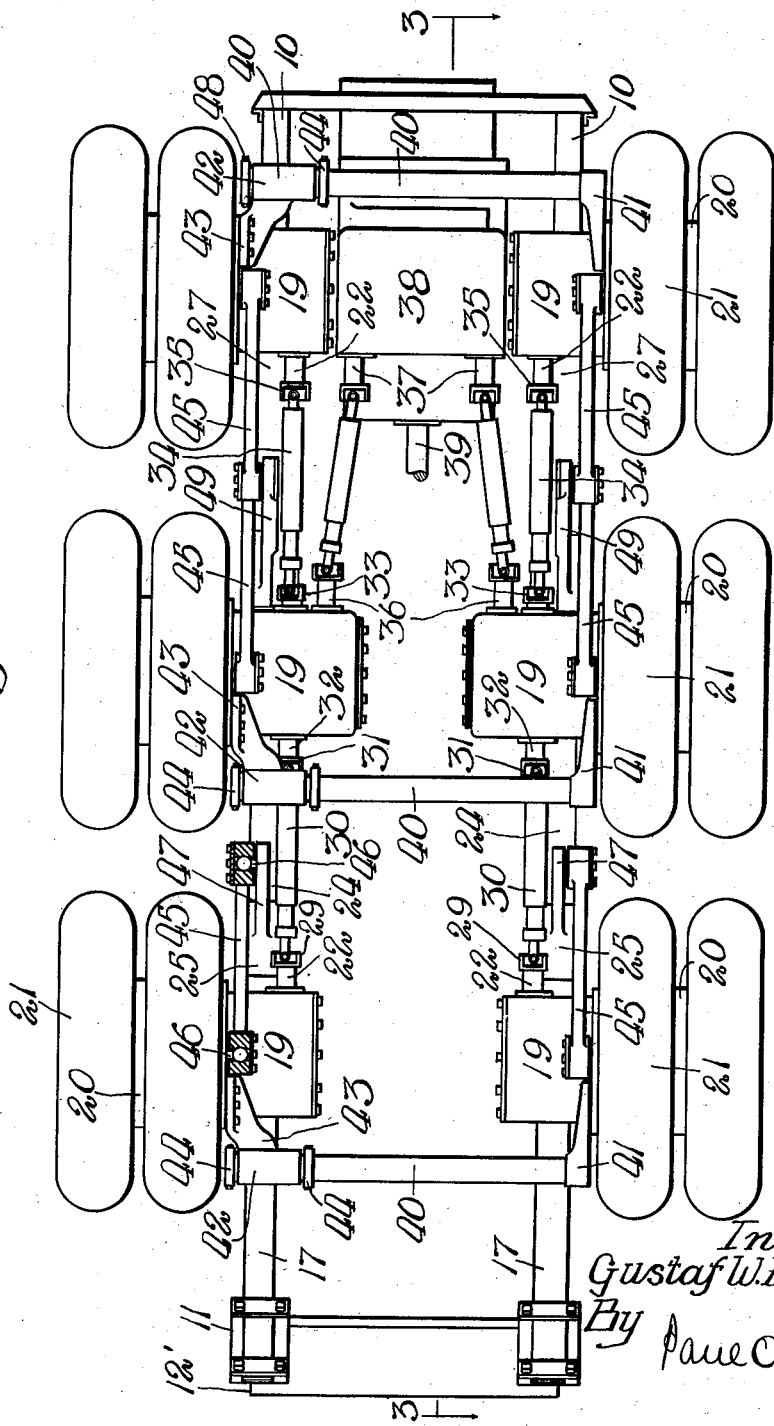

Dec. 17, 1940. G. W. ENGSTROM 2,224,955
TRACTOR
Filed March 6, 1939 3 Sheets-Sheet 3
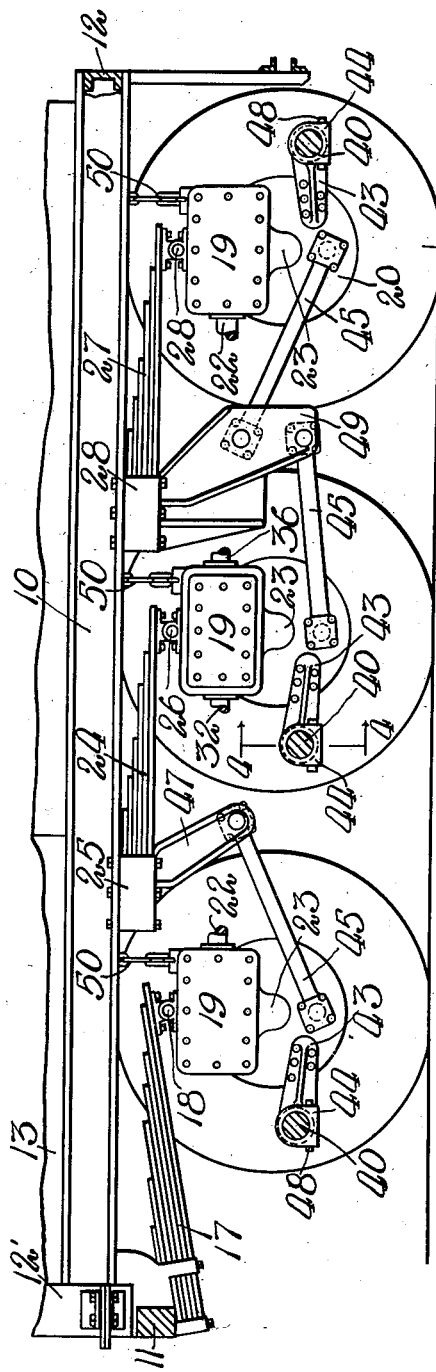
Inventor
Gustaf W. Engstrom
By Paul O. Pippel
Atty.

Patented Dec. 17, 1940

2,224,955

UNITED STATES PATENT OFFICE 2,224,955

TRACTOR

Gustaf W. Engstrom, Riverside, Ill., assignor to International Harvester Company, a corporation of New Jersey Application March 6, 1939, Serial No. 260,030

7 Claims. (Cl. 180—22)

This invention relates to a wheel tractor. More particularly it relates to a six-wheel tractor with each of the wheels being individually and resiliently supported.

In the design and construction of tractors, various type of traction means have been utilized. Where maximum traction is desired or under conditions where wheels cannot be satisfactorily utilized, traction chains have been used, tractors of this type being identified as crawler tractors. As a step between the conventional tractor with two driven traction wheels and crawler tractors, it has been proposed to build tractors with a plurality of drive wheels at each side. It is to a construction of this type that the present invention relates.

The principal object of the present invention is to provide an improved resilient wheel mounting for tractors having a plurality of wheels at each side thereof.

A more specific object is to provide linkage for resiliently supporting driven wheels, said linkage being particularly designed to take the driving torque in a manner so as to secure satisfactory traction for each of the drive wheels and to apply the traction effort at the best angle against the tractor.

Another object is to support individual drive units at opposite sides of the tractor to maintain the units parallel with respect to each other while permitting the angular movement with respect to each other about a transverse axis.

The above objects and others which will be apparent from the detailed description to follow are accomplished by a construction in which each drive unit at each side of the tractor is resiliently supported for vertical movement and is independently supported for angular movement about the transverse axis with respect to each other. To provide stability of the units, each pair consisting of a unit at each side of the tractor is supported to remain in vertical longitudinal spaced planes with respect to each other.

In the drawings:

Figure 2 is a bottom plan view of the tractor shown in Figure 1;

Figure 3 is substantially a section taken on the line 3—3 of Figure 2, the superstructure portion of the tractor not being shown in order to simplify the drawing; and, Figure 4 is a section taken on the line 4—4 of Figure 3.

Figure 1:
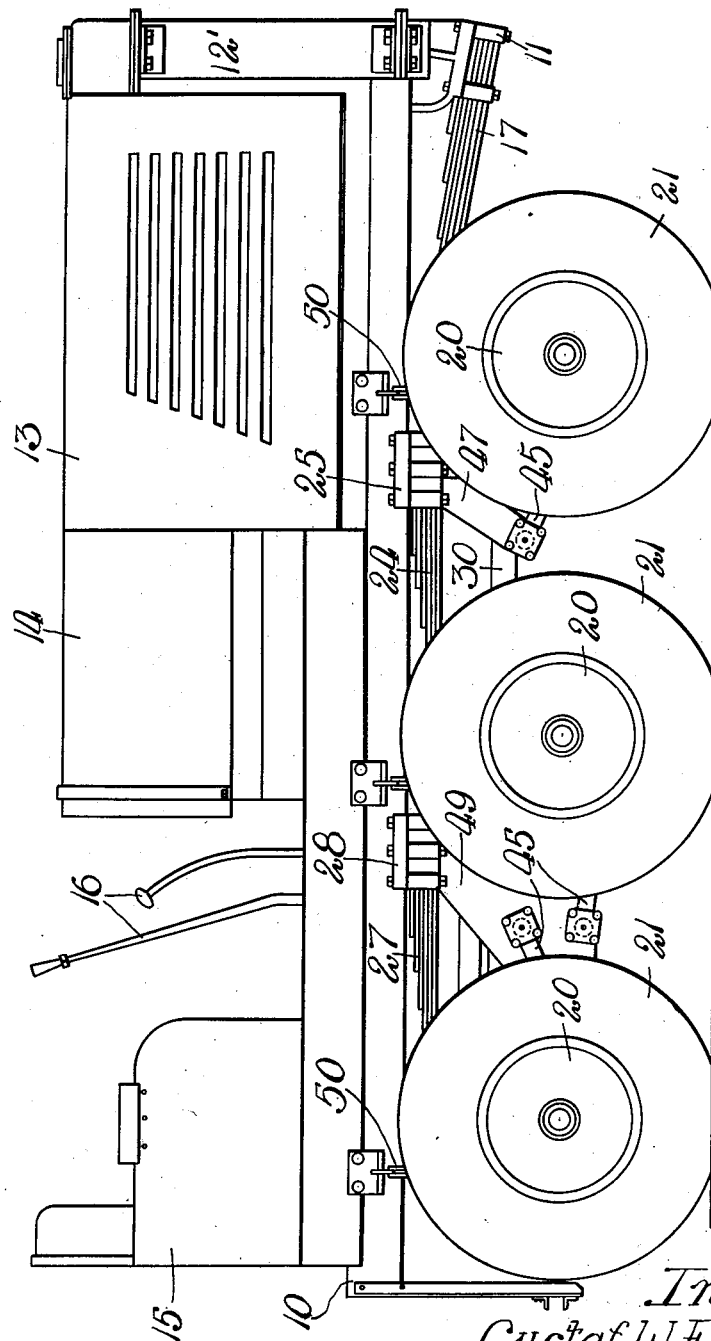
Figure 1 is a side elevation of a tractor embodying the invention.

In the description of the tractor, the frame will be considered as a unit having side frame members 10, a transverse front cross frame member 11 and a transverse rear frame member 12. In an actual construction of the machine, other supporting members will be utilized to carry the engine and transmission and to further brace the frame structure. In so far as this invention is concerned, the specific construction of the frame is immaterial and has been somewhat diagrammatically shown as consisting of side frame members and transverse front and rear cross members. A radiator structure 12', a hood 13, a gasoline tank 14, an operator's station 15, and control levers 16 have been shown in outline in Figure 1 to illustrate better the application of the invention to a tractor.

Leaf springs 17 are rigidly connected to the front cross frame member 11 by suitable clamping means. Said springs extend upwardly to the rear, being pivotally connected by pivot pins 18 to housings 19 which are adapted to contain drive gearing for supplying power to the axles on which front wheels 20 are mounted. Said wheels are illustrated as carrying dual pneumatic tires 21. The housings 19 include a portion into which a propeller shaft 22 extends for housing gear reduction means and a depending portion 23 which supports the drive axles for the wheels and forms means for attaching the remainder of the supporting and stabilizing linkage.

Intermediate springs 24 are rigidly connected by brackets 25 to the side frame members 10. Said springs are pivotally connected by pivot pins 26 with intermediate housings 19, the same in construction as those previously mentioned in the front of the tractor. Rear springs 27 are rigidly connected by brackets 28 with the side frame members 10. Said springs are pivotally connected by pivot pins 26 with the rear drive housings 19, the same in construction as the forward drive housings except in the respect that the drive shafts 22 extend into the housings from the front ends thereof.

Referring to Figure 2, the forward final drive shafts 22 are connected by universal joint assemblies 29 with extensible drive shafts 30 which in turn are connected by universal joint assemblies 31 with shafts 32 journaled in the intermediate housings 19 and extending therethrough. At their rear ends, the shafts 32 are connected by universal joint assemblies 33 as extensible shafts 34 which in turn are connected by universal joint assemblies 35 with the rear final drive shafts 22. Drive shafts 36 extending into the intermediate housings 19 are connected by suitable flexible means with power supplying shafts 37 extending into a power dividing casing 38. Said casing contains any conventional power dividing means satisfactory for delivering power to the units at the respective sides of the tractor. An input shaft 39 is illustrated by means of which power from the engine of the tractor is delivered to the mechanism in the casing 38. This drive structure has not been shown in detail as it is not a part of the present invention and may be of any type known in the prior art. The individual suspension of the units at the sides of the tractor is not broadly the invention of the present application as such structure is shown in applicant's Patent No. 2,166,411. The improvements in the suspension system constituting this invention will be clearly set forth in the detailed description to follow.

The forward housings 19 are held in position parallel with respect to each other by a transverse stabilizing member 40. Said member is rigidly connected to a bracket 41 which is in turn rigidly connected to the depending portion 23 of the housing 19 at one side of the tractor. The other end of the member 40 is provided with a shaft portion which rotatably extends through a bearing sleeve 42 formed as an integral part of a bracket 43. Thrust collars 44 at opposite ends of the sleeve 42 prevent movement of the member 40 transversely with respect to the sleeve 42 while permitting angular movement therebetween about a transverse axis. The bracket 43 is rigidly secured to the depending portion 23 of the housing 19 at its side of the tractor.

To support the forward housings 19 against tilting in a fore and aft direction, links 45 are connected for universal movement within the necessary range to connecting members 46 formed with spherical heads engaged by spherical sockets on the connecting ends of the links 45. Said links extend rearwardly upwardly, generally parallel to the spring 17, being angled upwardly to a somewhat greater extent. The upper ends of the links 45 are connected for universal movement in the same manner to the lower ends of attaching members 47; said members, as illustrated, are integral extensions of the brackets 25.

The intermediate housings 19 are provided wtih a transverse stabilizer exactly the same as the front stabilizer bearing the same reference characters. In connection with this stabilizer, attention is called to Figure 4 which shows a section through the stabilizer and illustrates means consisting of bolts 48 which clamp the thrust collars 44 in position. The transverse stabilizing system at the rear is also the same except in the respect that it extends rearwardly from the housings 19 rather than forwardly as in the case of the forward units.

The intermediate housings 19 are supported by the links 45 substantially identical with the forward links except in the angle at which they extend. These links are substantially parallel to the horizontal center springs 24, extending slightly upwardly at their rear ends out of parallel relation. These links are pivotally connected to members 49 which, as illustrated, are integral extensions of the securing brackets 26. The rear links 45 extend upwardly at an acute angle with respect to the rear horizontal springs 27, being pivotally connected to the members 49. The angle of the rear links 45 is such as to deliver the thrust effective on the rear housing due to driving torque at an upper angle against the frame structure of the tractor. The center and forward units are also supported by the links 45 so as to deliver the thrust directly endwise against the spring and to deliver the reaction against the supporting members 47 and 49 at the proper angle to prevent driving torque being applied in any substantial amount against the springs.

To support the housings 19 against downward movement when uneven terrain is being traversed by the tractor, suspension chains 50 are connected to the upper portions of the housings and to the frame of the tractor.

As briefly pointed out above, the important features of the invention are to provide a supporting linkage to deliver the thrust from driving torque longitudinally of the spring, thereby preventing deflection of the springs by driving torque. This construction leaves the springs free to carry the weight of the tractor which means that they may be made much lighter and more resilient than if it was necessary to construct them for carrying large proportions of the driving torque. As another feature of the supporting linkage, it is possible to obtain more even traction of the multiple driving wheels when they are supported in such a manner as not to be deflected by spring action upon the application of torque against the springs.

Another important feature of the present invention is the transverse stabilizing construction which permits the unit at one side to move angularly with respect to the unit at the other side, while being maintained against tilting with respect to each other about a longitudinal axis. This construction permits the wheels to more readily follow ground irregularities and to obtain more uniform traction.

It is to be understood that applicant has shown and described only one embodiment of his improved supporting and stabilizing construction for multiple wheel tractors and that he claims as his invention all modifications falling within the scope of the appended claims.

What is claimed is:

1. In an automotive vehicle including a frame and having an independent wheel supporting unit at each side thereof, means for supporting the units respectively for movement vertically relative to the vehicle frame, and, in combination therewith, a stabilizing bar disposed transversely of the frame and independent thereof and rigidly connected to one unit and pivotally connected to the other unit on a transverse axis.

2. In an automotive vehicle including a frame and having an independent gear housing at each side thereof, drive axles and wheels carried respectively by said housings and means for supporting the housings respectively for movement vertically relative to the vehicle frame, and, in combination therewith, a stabilizing bar disposed transversely of the frame and independent thereof and rigidly connected to one housing and pivotally connected to the other housing on a transverse axis.

3. In an automotive vehicle having a frame structure and an independent wheel supported unit at each side thereof, resilient means for supporting said units respectively for movement vertically relative to the frame structure, and, in combination therewith, a stabilizing bar disposed transversely of the frame and independent thereof and rigidly connected to one unit and pivotally connected to the other unit for angular movement about a transverse axis.

4. In an automotive vehicle having a frame structure and an independent gear housing at each side thereof, drive axles and wheels carried by said housings and resilient means for respectively supporting the housings for movement vertically relative to the frame structure, and, in combination therewith, a transverse stabilizing bar disposed independently of the frame and rigidly connected to one housing and pivotally connected to the other housing for angular movement about a transverse axis.

5. In a tractor, the combination with the frame of the tractor, of an independent axle housing secured at each side of the frame by means providing for upward movement against spring pressure, an axle extending from each housing, a drive wheel carried by each of said axles, means including gearing respectively in the housings for supplying power to said axles, a transverse stabilizer bar disposed independently of the frame and connected at each end to said housings, the connection at one end being pivoted on a transverse axis, and torque rods extending longitudinally of the tractor, said rods being pivotally secured to the tractor and to the housings.

6. In an automotive vehicle having an independent gear housing at each side thereof substantially in transverse alinement, drive axles and wheels carried respectively by said housings and resilient means for supporting the housings respectively for movement vertically relative to the vehicle, and, in combination therewith, a bracket mounted on each of the housings, and a transverse stabilizing bar disposed independently of the frame and rigidly connected to one bracket and pivoted to the other bracket for angular movement about a transverse axis and supported on said brackets to support the housings against relative twisting movement about a longitudinal axis and against relative lateral movement in a transverse direction.

7. In a tractor having a plurality of drive units at each side thereof, the combination with the frame of the tractor, of independent axle drive housings secured at opposite sides of the frame in transverse alinement by means respectively providing for upward movement of each housing against spring pressure, an axle extending from each housing, a drive wheel carried by each of said axles, means including gearing respectively in the housings for supplying power to said axles, a transverse stabilizer bar for each pair of housings, each bar being disposed independently of the frame and connected respectively at its ends to each housing of a pair, one of said connections being pivoted on a transverse axis to provide for limited angular movement of one housing relative to the other, a supporting member secured to each side of the tractor frame longitudinally spaced from each of the housings, and torque rods secured adjacent the lower end of the members and to the housings.

GUSTAF W. ENGSTROM.